US010001614B2

(12) United States Patent
Gao et al.

(10) Patent No.: US 10,001,614 B2
(45) Date of Patent: Jun. 19, 2018

(54) HYBRID FIBER OPTIC AND GRAPHENE CABLE (71) Applicant: Halliburton Energy Services, Inc., Houston, TX (US)

(72) Inventors: Li Gao, Katy, TX (US); John L. Maida, Houston, TX (US); Etienne Samson, Cypress, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days. days.

(21) Appl. No.: 15/127,597

(22) PCT Filed: May 5, 2014

(86) PCT No.: PCT/US2014/036799
§ 371 (c)(1),
(2) Date: Sep. 20, 2016

(87) PCT Pub. No.: WO2015/171111
PCT Pub. Date: Nov. 12, 2015

(65) Prior Publication Data
US 2017/0160503 A1 Jun. 8, 2017

(51) Int. Cl.
*G02B 6/44* (2006.01)
*E21B 47/12* (2012.01)
(Continued)

(52) U.S. Cl.
CPC .......... *G02B 6/4416* (2013.01); *E21B 17/003* (2013.01); *E21B 47/123* (2013.01);
(Continued)

(58) Field of Classification Search
USPC .................................................. 385/110–111
See application file for complete search history.

(56) References Cited

U.S. PATENT DOCUMENTS

2006/0147164 A1* 7/2006 Bau ...................... G02B 6/4484
385/111
2009/0208743 A1 8/2009 Pettit
(Continued)

FOREIGN PATENT DOCUMENTS

| KR | 20130100045 | 9/2013 |
|---|---|---|
| WO | 2009060411 | 5/2009 |
| WO | 2015171111 | 11/2015 |

OTHER PUBLICATIONS

Li et al., "Flame Synthesis of Few-Layered Graphene/Graphite Films", Chem. Commun., 47, 2011, 3520-3522.
(Continued)

*Primary Examiner* — Eric Wong
(74) *Attorney, Agent, or Firm* — Kilpatrick Townsend & Stockton LLP (57) ABSTRACT An optical cable can include one or more graphenic elements disposed about one or more optically transmissive fibers. A graphenic element can be a coating of graphene or amorphous graphite, a ribbon of graphene or amorphous graphite, or fibers of graphene or amorphous graphite. The graphenic element provides a path for electrical conduction while the optically transmissive fiber provides a path for optical transmission. An optical cable as disclosed herein can include a plurality of electrical and optical paths with a much smaller diameter and weight than traditional cables.

17 Claims, 9 Drawing Sheets (51) Int. Cl.
    *E21B 17/00* (2006.01)
    *B82Y 20/00* (2011.01)
(52) U.S. Cl.
    CPC ........... *G02B 6/443* (2013.01); *G02B 6/4486* (2013.01); *G02B 6/4492* (2013.01); *B82Y 20/00* (2013.01)

(56) References Cited

U.S. PATENT DOCUMENTS

| | | | |
|---|---|---|---|
| 2013/0322891 A1 | 12/2013 | Howe et al. | |
| 2014/0079360 A1* | 3/2014 | Winarski | G02B 6/262 385/102 |
| 2016/0041354 A1* | 2/2016 | Guenter | G02B 6/4432 385/86 |
| 2016/0252693 A1* | 9/2016 | Sutehall | G02B 6/4413 385/110 |

OTHER PUBLICATIONS

International Patent Application No. PCT/US2014/036799, "International Search Report and Written Opinion", dated Jan. 28, 2015, 12 pages.
Bae et al., "Roll-to-roll production of 30-inch graphene films for transparent electrodes", Nature Nanotechnology, DOI: 10.1038/NNANO.2010.132, Jun. 20, 2010, 13 pages.

* cited by examiner

HYBRID FIBER OPTIC AND GRAPHENE CABLE

CROSS-REFERENCE TO RELATED APPLICATIONS

This is a U.S. national phase under 35 U.S.C. 371 of International Patent Application No. PCT/US2014/036799, titled "Hybrid Fiber Optic and Graphene Cable" and filed May 5, 2014, the entirety of which is incorporated herein by reference.

TECHNICAL FIELD

The present disclosure relates to oilfield cables generally and more specifically to optical cables with electrical conductors for use in oilfield operations.

BACKGROUND

In oilfield operations, wireline or slickline cables can be used to transmit power and data between the surface and downhole tools. These lines often use combinations of electrical conductors and sometimes fiber optic cables. The electrical conductors can generally be made of copper, such as soft annealed copper. Existing cables can be at least approximately six millimeters, thirteen-and-a-half millimeters, or more in diameter, depending on the number of optical and electrical conductors. Additionally, when using electrical conductors to transfer data, capacitance and crosstalk can become problematic and may result in the need for thicker coatings or jackets, thus increasing the size of the cable further. Also, the amount of copper necessary in certain cables can result in cables having significant weight.

BRIEF DESCRIPTION OF THE DRAWINGS

The specification makes reference to the following appended figures, in which use of like reference numerals in different figures is intended to illustrate like or analogous components

DETAILED DESCRIPTION

Certain aspects and features of the present disclosure relate to an optical cable that includes one or more graphenic elements disposed about one or more optically transmissive fibers. A graphenic element can be a coating of graphene or amorphous graphite, a ribbon of graphene or amorphous graphite, or fibers of graphene or amorphous graphite. The graphenic element provides a path for electrical conduction while the optically transmissive fiber provides a path for optical transmission. An optical cable as disclosed herein can include electrical and optical paths with a much smaller diameter and weight than traditional cables.

Optical cables can include optical fibers that transmit data at very high rates. These optical fibers can weigh less than copper wires and have smaller diameters. Therefore, the use of optical fibers to transmit data to and/or from tools downhole can be beneficial. Still, many tools downhole must receive power from the surface in order to function and communicate through optical fibers. In order to provide power, graphenic elements can be incorporated into optical cables. The graphenic elements can conduct electricity, such as supplying downhole tools with DC power. In some embodiments, the graphenic elements include one or more layers of graphene. Graphene can be a thin layer, or single layer, of crystalline carbon. Graphene can have very strong breaking strength and can have excellent electrical conductivity (e.g., about 35% less electrical resistivity than copper). In some embodiments, an optical cable can include graphenic elements that conduct DC power to downhole tools, and optical fibers that enable communication between the tool and the surface.

In some embodiments, one or more graphenic elements can be also used to provide structural support to the optical cable, thus eliminating the need for any jacket or armature surrounding the cable.

In some embodiments, a graphenic ribbon can be formed by growing graphene on copper foil, transferring the graphene to a polymer support, and then transferring the graphene to a target. The graphenic ribbon can be wrapped around an optical fiber. A wrapped ribbon can provide increased flexibility and resiliency to the optical cable. The ribbon can be wrapped around the optical fiber lengthwise (e.g., longitudinally), helically, or otherwise. To increase current carrying capability, multiple ribbons of graphene can be combined on a single-strand or multi-strand fiber optic cable. In some embodiments, multiple ribbons of graphene can be electrically insulated from one another to provide separate electrical conduction paths.

In some embodiments, an optical fiber can be coated in a graphenic element. A flame synthesis method can be used, including surrounding the optical fiber in a protection flame and applying a carburization flame, then capping the optical fiber, removing the carburization flame, and lowering the protection flame. A carbon precipitation of few-layered graphenic films can be achieved on the optical fiber.

In some embodiments, graphene can be sooted continuously over the surface of an optical fiber to generate a continuous graphenic element. In some embodiments, a graphenic layer can provide a hydrogen permeation delay barrier to the coated optical fiber, which can increase glass lifetime when under non-zero tensile, bend, and twist tensions by eliminating water-induced chemical corrosion of microcracks over the optical fiber's surface. A graphene coating can serve as both a current carrying element and a hydrogen permeation delay barrier.

An optical fiber can have multiple layers, including a core, a cladding, a buffer, and a jacket. A graphenic element can be disposed outside any layer (e.g., between the core and the cladding, outside the jacket, or others), and can replace one or more of the cladding, buffer, and jacket.

Optical cables with one or more graphenic elements can also be used for distributed sensing. The use of graphenic elements can enable the use of distributed sending in harsh environments without the use of an armature.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

Figure 1:
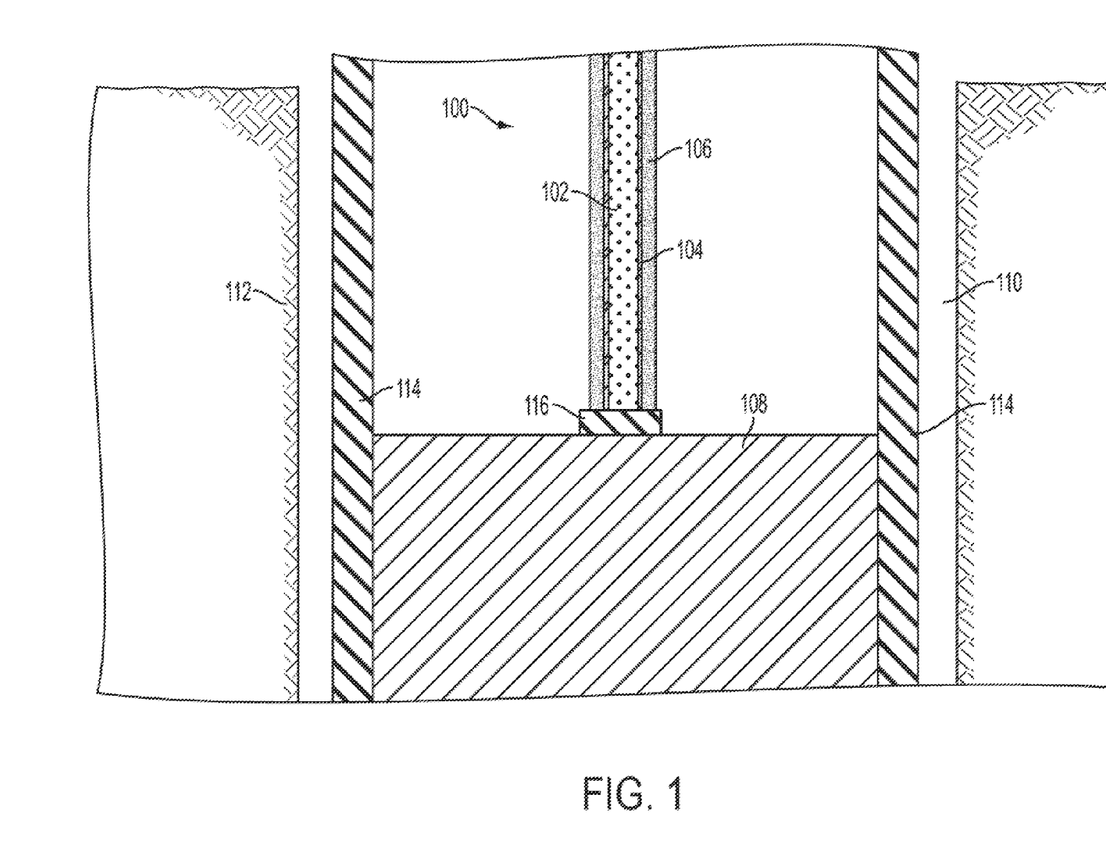
FIG. 1 is a schematic diagram of a wellbore system that includes an optical cable that includes one or more optical fibers and one or more graphenic elements according to one embodiment.

FIG. 1 is a schematic diagram of a wellbore system that includes an optical cable 100 that includes one or more optical fibers 102 and one or more graphenic elements 104 according to one embodiment. Each optical fiber 102 can provide an optical communication path between a downhole tool 108 and equipment on the surface. Each graphenic element 104 can provide an electrical pathway between the downhole tool 108 and equipment on the surface. The graphenic element 104 can supply the downhole tool 108 with DC power while the optical fiber 102 enables the downhole tool 108 to transmit and/or receive data to and/or from the surface.

The wellbore system also includes a wellbore 110 penetrating a subterranean formation 112 for the purpose of recovering hydrocarbons, storing hydrocarbons, disposing of carbon dioxide, or the like. The wellbore 110 can be drilled into the subterranean formation 112 using any suitable drilling technique. While shown as extending vertically from the surface in FIG. 1, in other examples the wellbore 110 can be deviated, horizontal, or curved over at least some portions of the wellbore 110. The wellbore 110 can be cased, open hole, contain tubing, and can include a hole in the ground having a variety of shapes or geometries.

A vehicle, a drilling rig, a completion rig, a workover rig, or other suitable structures or equipment, or combination thereof, can support an optical cable 100 in the wellbore 110, but in other examples a different structure can support the optical cable 100. In some aspects, a rig can include a derrick with a rig floor through which the optical cable 100 extends downward from the rig into the wellbore 110. A rig can be supported by piers extending downwards to a seabed in some implementations. Alternatively, a rig can be supported by columns sitting on hulls or pontoons (or both) that are ballasted below the water surface, which may be referred to as a semi-submersible platform or rig. A winching apparatus can be used with the optical cable 100. The optical cable 100 can be incorporated into or can be a wireline or slickline.

In some embodiments, the graphenic element 104 can be at least partially surrounded by a jacket 106 or other coating that is electrically insulating. The electrically insulating jacket 106 can protect the graphenic element 104 from completing an electrical circuit with undesired objects, such as tubing 114 within the wellbore 110. In some embodiments, a circuit can be completed as electricity passes through the graphenic element 104, through the tool 108, and up through tubing 114 in the wellbore 110.

In some embodiments, the optical cable 100 can include an end connector 116. The end connector 116 can electrically couple the graphenic element 104 to the downhole tool 108 and optically couple the optical fiber 102 to the downhole tool 108. In some embodiments, the end connector 116 can be two separate connectors, such as in the case that the graphenic element 104 terminates in an electrical connector before the end of the optical fiber 102.

Figure 2A:
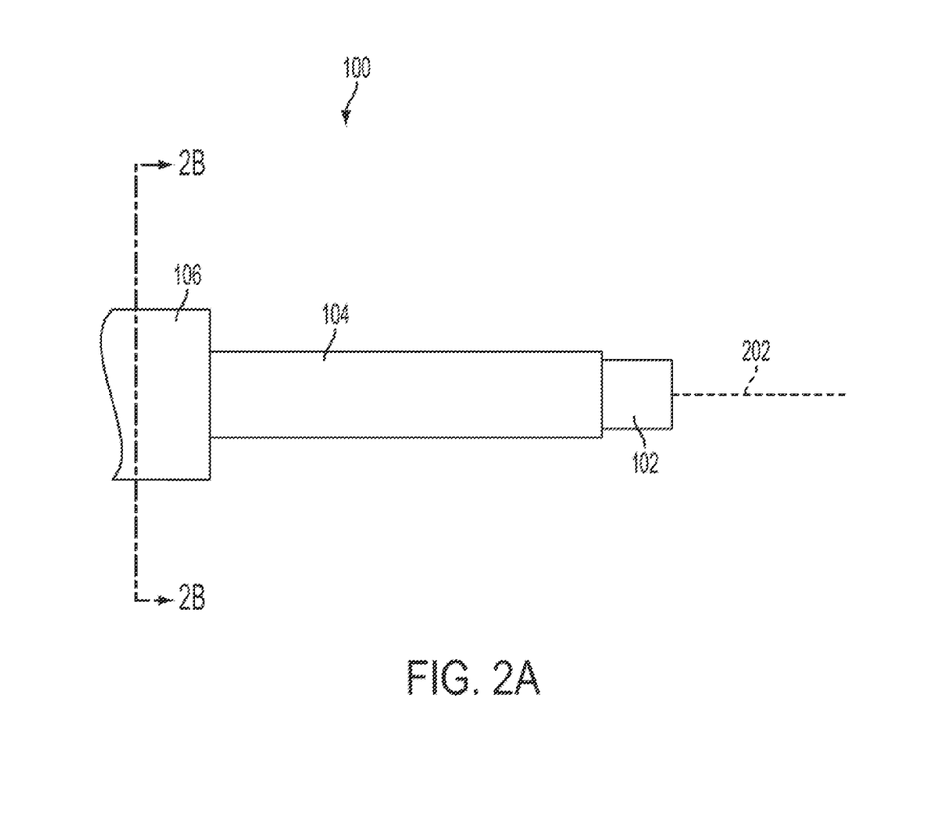
FIG. 2A is a side view of an optical cable having a graphenic element continuously disposed about an optical fiber according to one embodiment.

FIG. 2A is a side view of an optical cable 100 having a graphenic element 104 continuously disposed about an optical fiber 102 according to one embodiment. The graphenic element 104 can provide power to a downhole tool, while the optical fiber 102 can provide a communication path between the downhole tool and the surface. The optical fiber 102 can have a longitudinal axis 202.

The optical cable 100 can include an optical fiber 102 and a graphenic element 104 disposed about the optical fiber 102. As used herein, a graphenic element 104 "disposed about" an optical fiber 102 includes being disposed around the optical fiber 102 (e.g., wrapped around), as well as adjacent the optical fiber 102 (e.g., a graphene strand positioned adjacent the optical fiber 102). The optical fiber 102 may be comprised of a core and a cladding. An optical fiber 102 can be approximately 0.25 mm in diameter. An optical fiber 102 can be greater than 0.1 mm in diameter. The graphenic element 104 can fully surround the optical fiber 102. The graphenic element 104 can be one or more layers of graphene. In some embodiments, the optical cable 100 can optionally include a jacket 106. The jacket can be a metal sheath, a plastic sheath, or any other suitable jacket. The jacket may be further coated or covered, such as with an electrical insulating material.

In some embodiments, the graphenic element 104 can be a ribbon of graphene or a coating of graphene. A graphenic element 104 can be one or multiple layers of graphene. In some embodiments, the graphenic element 104 can be a ribbon of amorphous graphite or a coating of amorphous graphite. A graphenic element 104 is capable of conducting electricity and can provide a downhole tool with electricity, such as a DC current or AC current.

In some embodiments the graphenic element 104 can be a ribbon of graphene disposed about the optical fiber 102. The ribbon of graphene can include one or more graphene layers. The ribbon of graphene can be adhered to the optical fiber 102 (e.g., with a glue), otherwise secured to the optical fiber 102 (e.g., held in place by a tight outer covering), or not secured to the optical fiber 102 (e.g., loosely placed around the optical fiber 102). A ribbon of graphene can be otherwise applied to the optical fiber 102 as described in further detail below.

A ribbon of graphene can be created using known methods. A ribbon of graphene can be formed, for example, by growing graphene on copper foil, transferring the graphene to a polymer support, and then transferring the graphene to the optical fiber 102.

In some embodiments, a graphenic element 104 can be a coating that has been applied to the optical fiber 102. The coating can be directly grown on the glass of the optical fiber 102. In one example, graphene can be grown on the optical fiber 102 through the use of an anoxic methane reactor. Natural gas can be put into a chamber without oxygen. Under high temperature, hydrogen can crack off and soot can precipitate on the optical fiber 102. The glass of the optical fiber 102 can be heated sufficiently so that the carbon adheres to the surface of the optical fiber 102.

In some embodiments, a flame synthesis method can be used to coat the optical fiber 102 in graphene. The optical fiber 102 can be surrounded in a protection flame before a carburization flame is applied. Thereafter, the optical fiber 102 can be capped, while the carburization flame is removed and the protection flame is lowered. A few layers of graphene is formed on the surface of the optical fiber 102.

In some embodiments, known techniques of sooting graphene layers can be used in order to soot a continuous layer of graphene over the surface of the optical fiber 102 to generate a graphenic element 104.

Various ways of applying a graphenic element 104 to an optical fiber 102 are presented above. In some embodiments, the optical fiber 102 includes a buffer coating, such as a buffer coating designed to protect the optical fiber 102 from scratches. In some embodiments, the graphenic element 104 can be applied before or after the buffer coating is applied to the optical fiber 102. The buffer coating can be a polyamide, an acrylate, a fluoro-acrylate, a silicone, any suitable non-conductive polymer, or any other suitable material. In some embodiments, the buffer coating can be doped with metal ions. A doped buffer coating can provide conductivity. A doped buffer coating may also increase the ability of a graphene coating to adhere to the optical fiber 102.

Figure 2B:
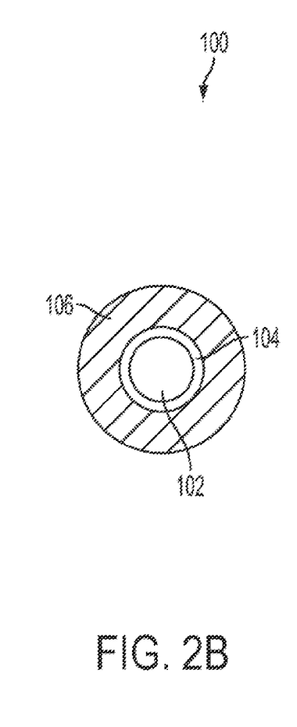
FIG. 2B is a cross-sectional view of the optical cable of FIG. 2A taken across line 2B:2B according to one embodiment.

FIG. 2B is a cross-sectional view of the optical cable 100 of FIG. 2A taken across line 2B:2B according to one embodiment. The optical cable 100 can include an optical fiber 102, a graphenic element 104, and an optional jacket 106.

Figure 3:
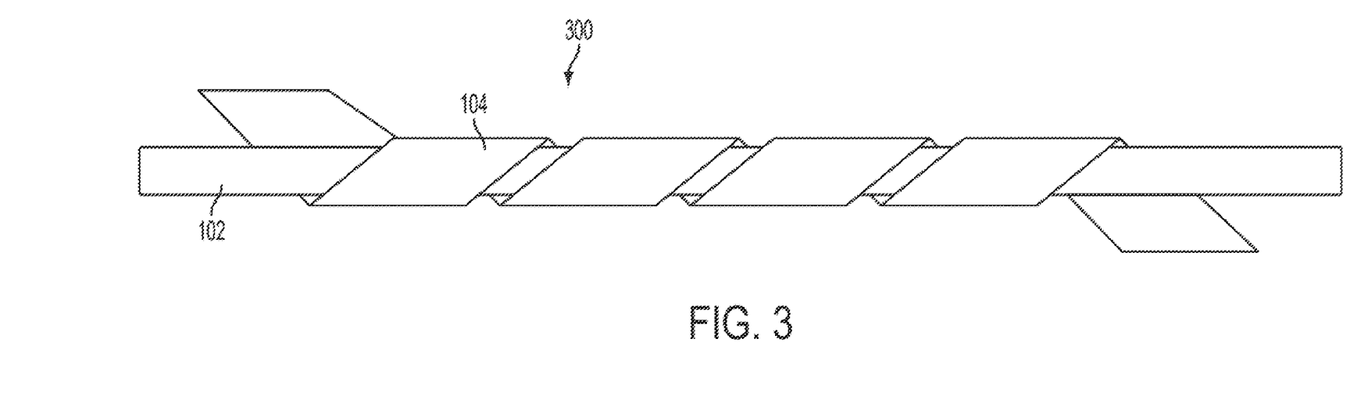
FIG. 3 is a side view of an optical cable having a single graphenic element helically wrapped about an optical fiber according to one embodiment.

FIG. 3 is a side view of an optical cable 300 having a single graphenic element 104 helically wrapped about an optical fiber 102 according to one embodiment. The graphenic element 104 can be a ribbon of graphene (e.g., a pre-formed graphene tape) that is wrapped around an optical fiber 102 in a helical or helix-like configuration. The graphenic element 104 can be optionally adhered or otherwise secured to the optical fiber 102. In some embodiments, the graphenic element 104 includes a glue or other adhesive on one side that secures the graphenic element 104 to the optical fiber 102 as the graphenic element 104 is applied wound around the optical fiber 102. The graphenic element 104 can act as an electrical conductor to transmit electricity from one end of the optical cable 300 to the other.

Figure 4:
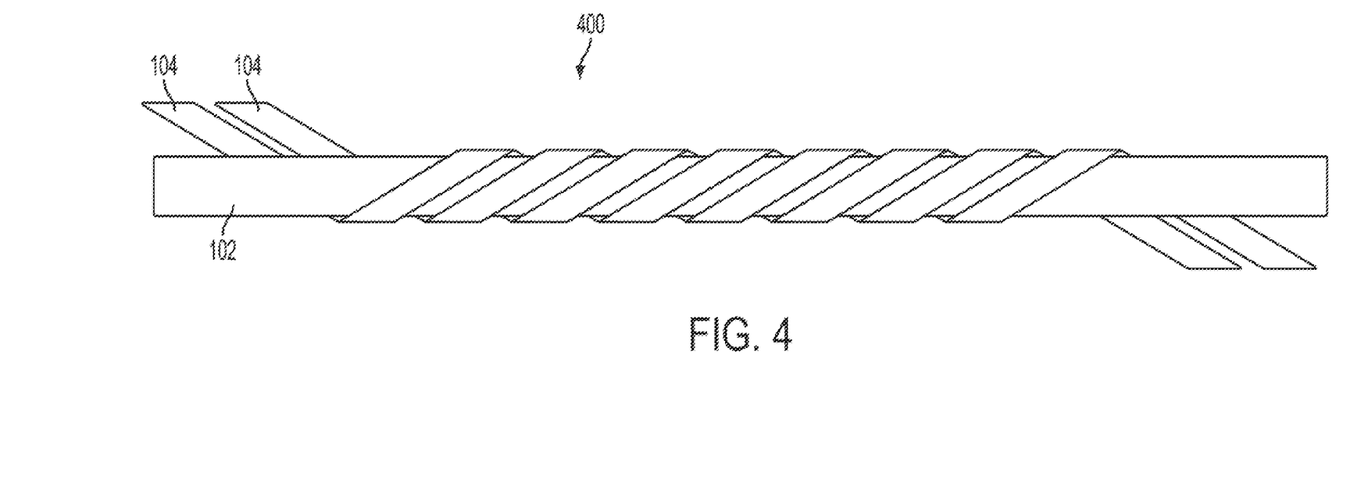
FIG. 4 is a side view of an optical cable having multiple graphenic elements helically wrapped about an optical fiber according to one embodiment.

FIG. 4 is a side view of an optical cable 400 having multiple graphenic elements 104 helically wrapped about an optical fiber 102 according to one embodiment. Each graphenic element 104 can be a ribbon of graphene wrapped around an optical fiber 102 in a helical or helix-like fashion. The two graphenic elements 104 can each be optionally adhered or otherwise secured to the optical fiber 102.

In some embodiments, the each of the graphenic elements 104 can be positioned around the optical fiber 102 so that they do not overlap each other or otherwise provide a path of electrical conduction between each other. Each of the graphenic elements 104 can act as a separate electrical pathway. In some embodiments, each of the graphenic elements can be coated or otherwise covered in a suitable electrically insulating material. In some embodiments, one graphenic element 104 can be applied to the optical fiber 102 before the optical fiber is coated in a buffer coating, after which another graphenic element 302 can be applied to the optical fiber. Depending on the buffer coating used, the buffer coating can act as an electrical insulator or a conductor between the two graphenic elements 104.

In some embodiments, multiple graphenic elements 104 are not electrically insulated from one another.

Figure 5:
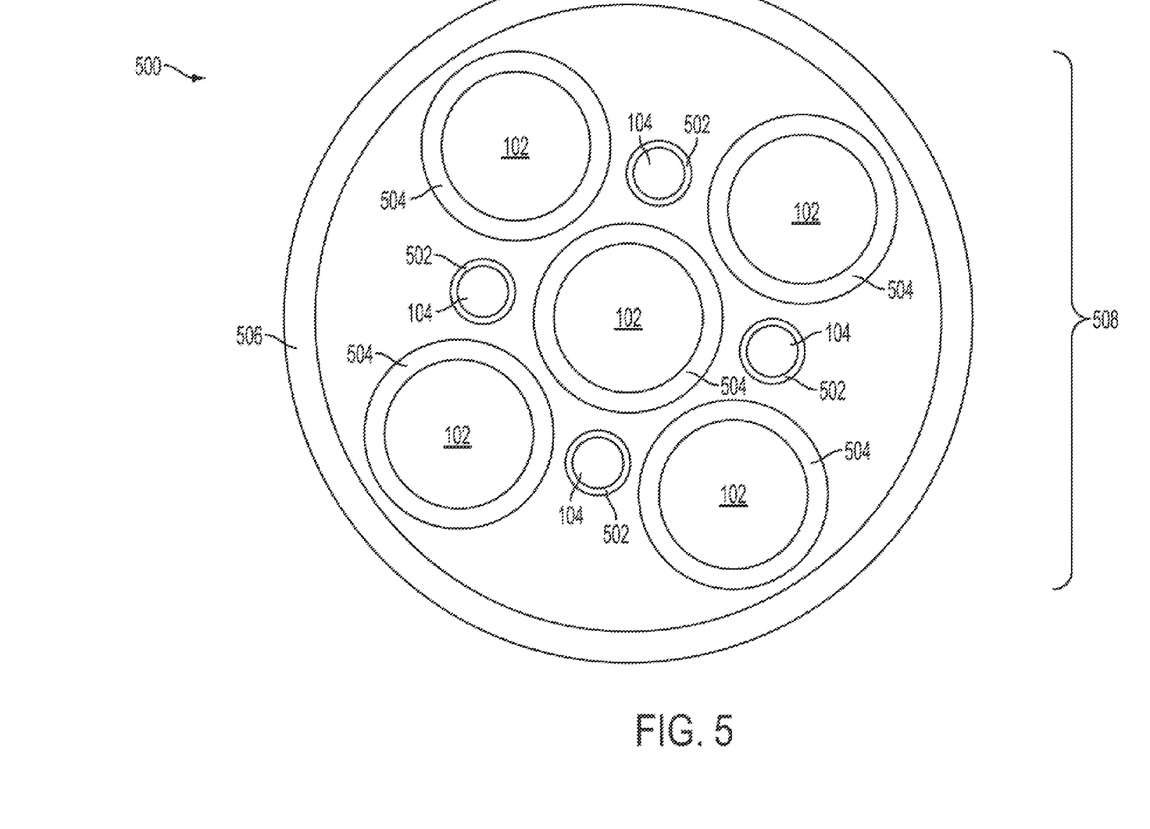
FIG. 5 is a cross-sectional view of an optical cable having multiple graphenic elements and multiple optical fibers according to one embodiment.

FIG. 5 is a cross-sectional view of an optical cable 500 having multiple graphenic elements 104 and multiple optical fibers 102 according to one embodiment. A single optical cable 500 can house multiple optical fibers 102. Each optical fiber can optionally be coated in a buffer coating 504. Within the optical cable 500 are multiple graphenic elements 104. Each graphenic element 104 can be comprised of one or more strands of graphene. Each graphenic element 104 can optionally have its own buffer coating 402.

In alternate embodiments, each graphenic element 104 can be ribbons of graphene wound around one, several, each, or all of the optical fibers 102.

The graphenic elements 104 and optical fibers 102, including any optional buffer coatings 502, 504, comprise a bundle 508. The bundle 508 can be enclosed in a jacket 506.

Figure 6:
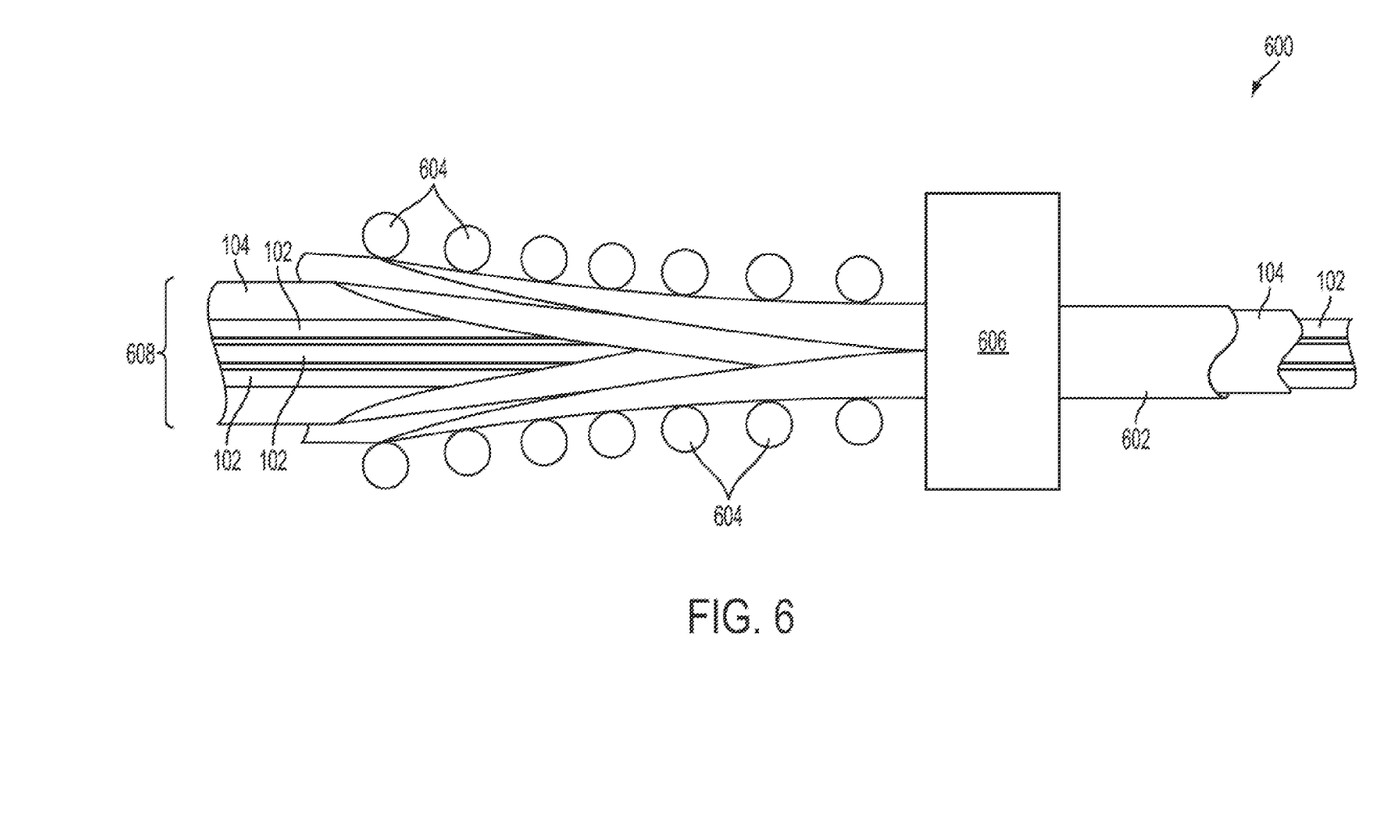
FIG. 6 is an illustration of the assembly of an optical cable according to one embodiment.

FIG. 6 is an illustration of longitudinal wrapping of an optical cable 600 according to one embodiment. An optical cable 600 can be comprised of a graphenic element 104 being longitudinally wrapped around one or more optical fibers 102. During longitudinal wrapping, the graphenic element 104 is wrapped around the one or more optical fibers 102 such that the length of the graphenic element 104 (e.g., from left to right in FIG. 6) is approximately parallel with the longitudinal axis 202 of at least one of the optical fibers 102.

The optical cable 600 can include multiple optical fibers 102, a graphenic element 104 in the form of a ribbon of graphene, and a jacket 602. Each optical fiber 102 can include a buffer component. The graphenic element 104 and the optical fibers 102 can comprise a bundle 608. The graphenic element 104 can be flat and can be sandwiched between the optical fibers 102 and a flat jacket 602. The bundle 608 and the jacket 602 can be fed through a set of rollers 604 that are positioned to fold the flat jacket 602 and flat graphenic element 104 into a tube shape. The combination of the folded graphenic element 104, folded jacket 602, and optical fibers 102 can be further fed through a sealing apparatus 606 that seals the jacket 602 together at its seam, resulting in a sealed, tube-shaped jacket 602 encircling the bundle 608. In some embodiments, the sealing apparatus 606 is a welder that welds the jacket 602.

In alternate embodiments, the bundle 608 can include any combination of optical fibers 102 and graphenic elements 104, including those disclosed above.

In some embodiments, the jacket 602 can be further coated in order to electrically insulate the graphenic element from the outside of the optical cable 600.

In some embodiments, the optical cable 600 does not include a jacket 602. The bundle 608 can pass through rollers 604 to fold the graphenic element 104 around the optical fibers 102. The sealing apparatus 606 can secure the graphenic element in a tube shape through the use of adhesives or other suitable sealing materials.

Figure 7:
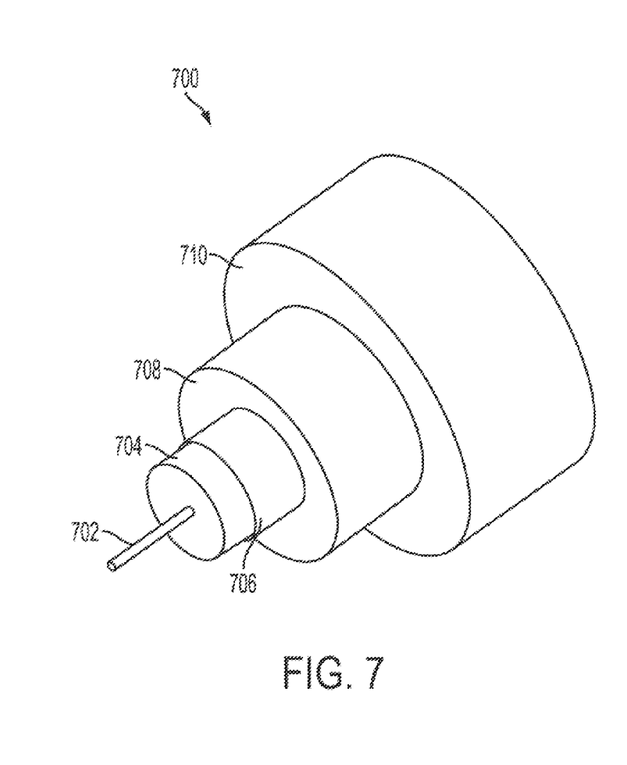
FIG. 7 is an illustration of an optical cable according to one embodiment.

FIG. 7 is an illustration of an optical cable 700 according to one embodiment. The optical cable 700 includes a core 702, a cladding 704, a graphenic element 706, a buffer coating 708, and a jacket 710. The graphenic element 706 can be positioned between the cladding 704 and the buffer coating 708.

Figure 8:
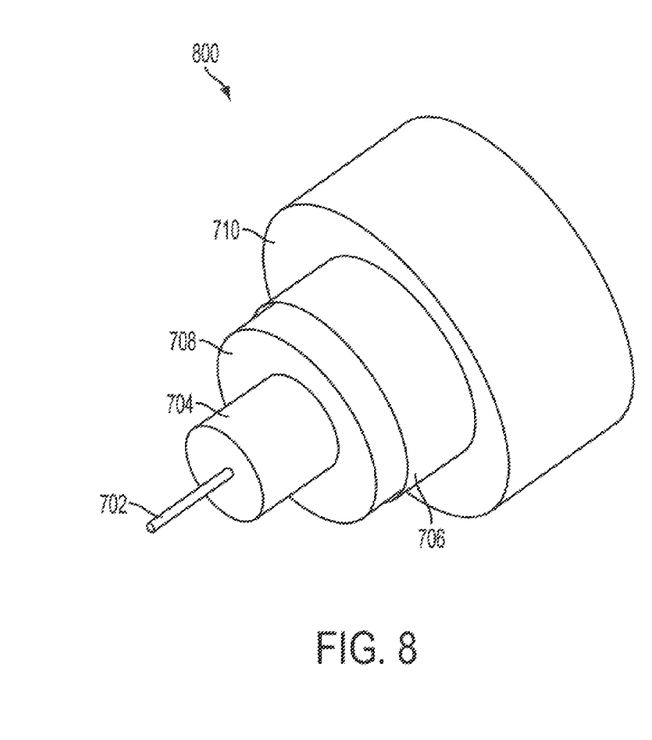
FIG. 8 is an illustration of an optical cable according to one embodiment.

FIG. 8 is an illustration of an optical cable 800 according to one embodiment. The optical cable 800 includes a core 702, a cladding 704, a buffer coating 708, a graphenic element 706, and a jacket 710. The graphenic element 706 can be positioned between the buffer coating 708 and the jacket 710.

In additional embodiments, the buffer coating 708 and/or jacket 710 can be omitted. In additional embodiments, each of the cladding 704, buffer coating 708, or jacket 710 can be replaced with a graphenic element 104 of approximately the same thickness.

In an embodiment, a 7 km optical cable with one optical fiber and one graphenic element that replaced the cladding 704 can conduct electricity end-to-end with a resistance of about 5728Ω and provide a current of about 175 mA from a 1 kV power source.

In an embodiment, a 7 km optical cable with one optical fiber and one graphenic element that replaced the buffer coating 708 can conduct electricity end-to-end with a resistance of about 1901Ω and provide a current of about 526 mA from a 1 kV power source.

In an embodiment, a 7 km optical cable with one optical fiber and one graphenic element that replaced the jacket 710 can conduct electricity end-to-end with a resistance of about 914Ω and provide a current of about 1094 mA from a 1 kV power source.

In an embodiment, a 7 km optical cable with one optical fiber and one graphenic element that replaced the cladding 704, buffer coating 708, and jacket 710 can conduct electricity end-to-end with a resistance of about 557Ω and provide a current of about 1794 mA from a 1 kV power source.

Figure 9:
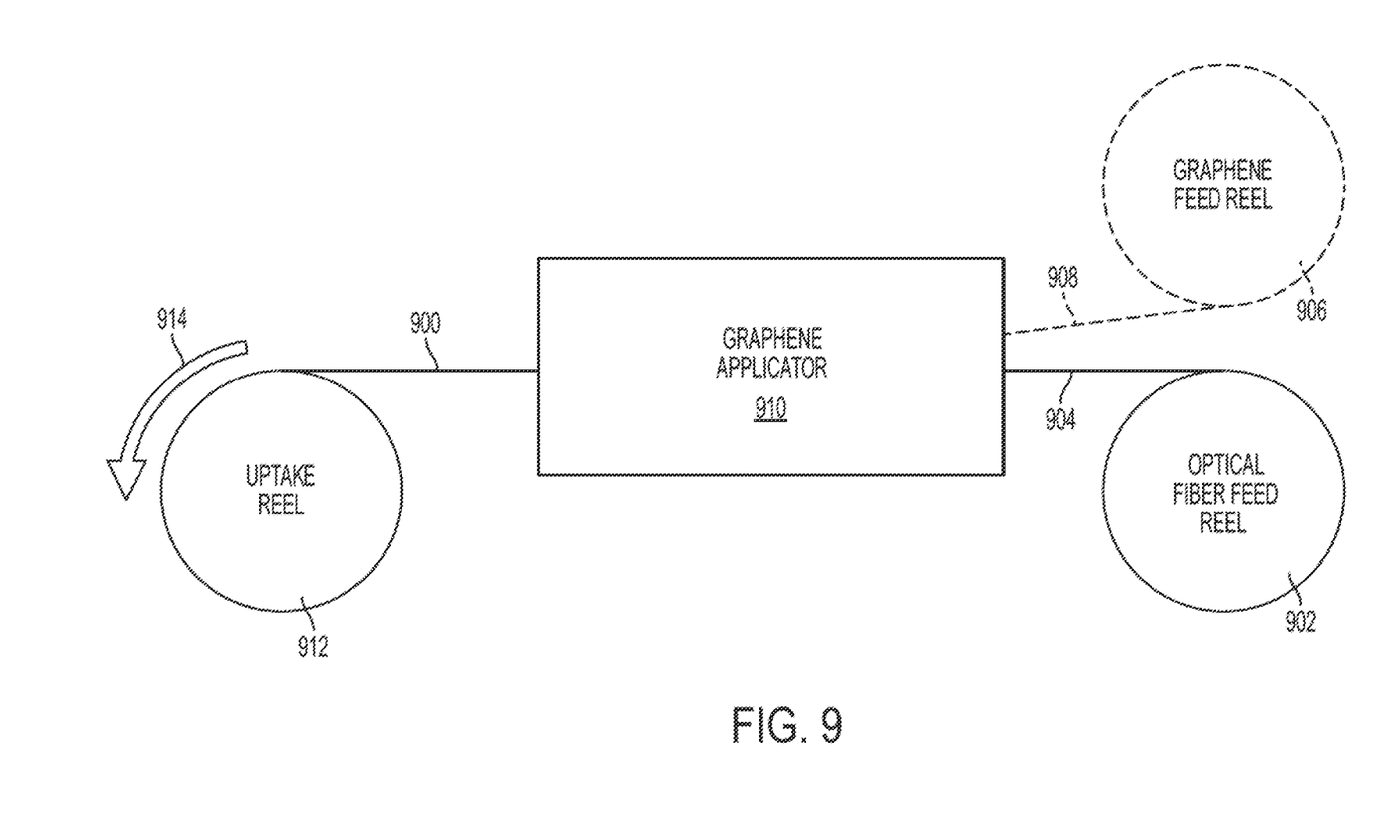
FIG. 9 is a schematic illustration of a system for preparing an optical cable according to one embodiment.

FIG. 9 is a schematic illustration of a system for preparing an optical cable 900 according to one embodiment. The system can include an optical fiber feed reel 902 wound with optical fibers 904, such as optical fibers 904 coated with a buffer coating. The optical fibers 904 can be fed through a graphene applicator 910 to create an optical cable 900, which can be wound onto an uptake reel 912. The uptake reel 912 can be moving in direction 914. The graphene applicator 910 can dispose one or more graphenic elements onto the optical fiber 904.

In some embodiments, an optional graphene feed reel 906 can feed a ribbon of graphene 908 into the graphene applicator 910, which then disposes the ribbon of graphene 908 around the optical fiber 904. The graphene applicator 910 can wrap the optical fiber 904 with the ribbon of graphene 908 in a helical fashion, as disclosed above, at least with reference to FIGS. 3-4. The graphene applicator 910 can alternatively wrap the optical fiber 904 with the ribbon of graphene 908 in a fully-encompassing manner, such as that disclosed above, at least with reference to FIG. 6. The graphene applicator 910 can dispose the ribbon of graphene 908 on the optical fiber 904 in other suitable ways.

In alternate embodiments, the graphene applicator 910 grows, applies, or otherwise coats the graphene directly on the optical fiber 904. In some embodiments, the graphene applicator 910 can include one or more heat sources. The graphene applicator 910 can include an anoxic methane reactor.

Figure 10:
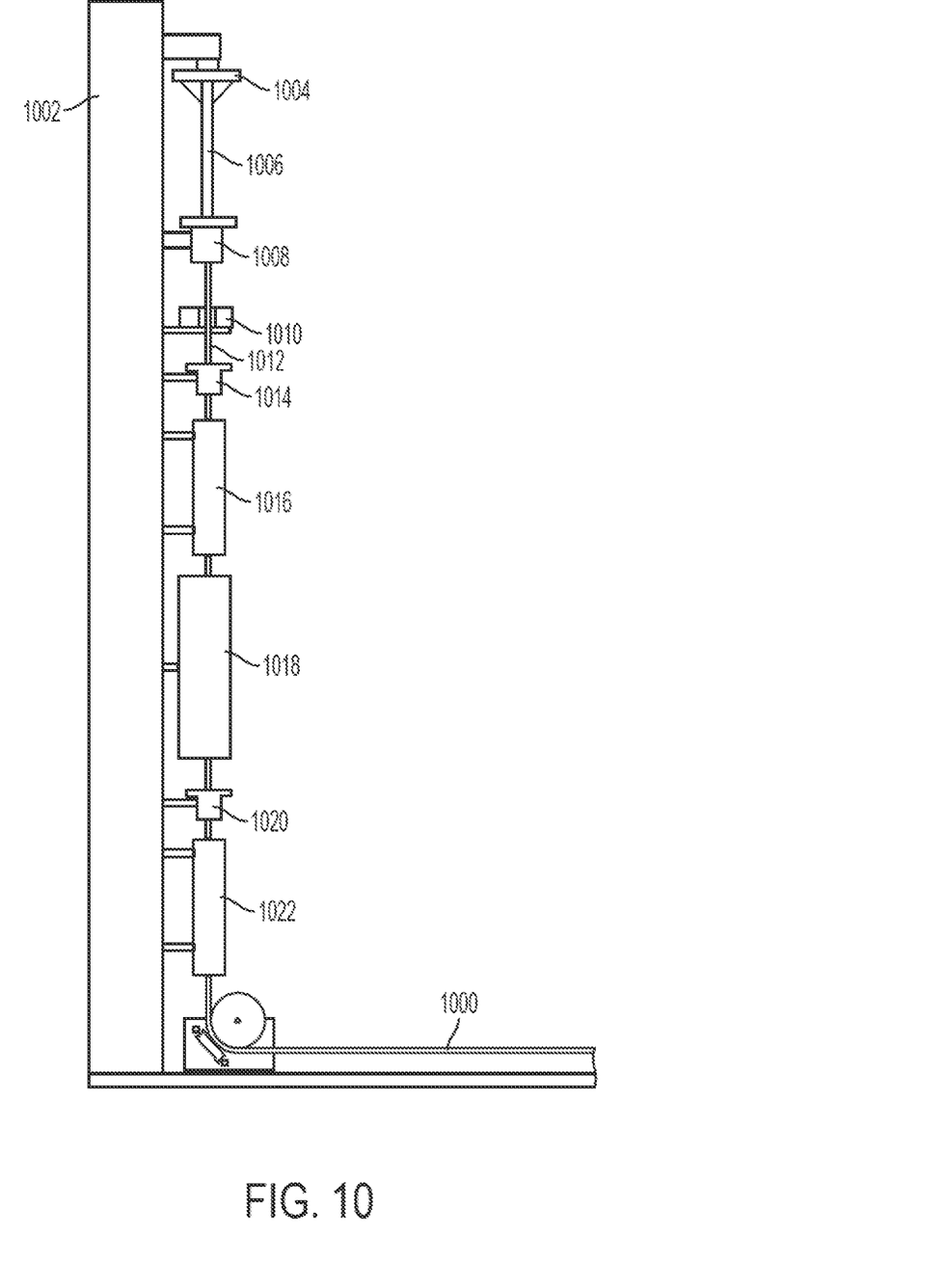
FIG. 10 is a schematic illustration of a system for preparing the optical cable according to one embodiment.

FIG. 10 is a schematic illustration of a system for preparing the optical cable 1000 according to one embodiment. A support 1002 can support various equipment used to prepare an optical cable 1000. A preform feed 1004 can hold a preform 1006. The preform 1006 can include material that makes up the core and cladding of the optical cable 1000. The preform 1006 can be drawn through a furnace 1008. A sensor 1010 can measure the diameter of the optical fiber 1012 and adjust the draw rate to ensure the optical fiber 1012 has the desired, uniform thickness. The optical fiber 1012 can be pulled through a first coating cup 1014 containing material for a buffer coating. The optical fiber 1012, with buffer coating material applied, can pass through a first curing oven 1016 to cure the buffer coating. The optical fiber 1012 can pass through a graphene applicator 1018. The graphene applicator 1018 can be any suitable graphene applicator, including at least those described above. The optical fiber 1012, now with a graphenic element, can pass through a second coating cup 1020 containing material for a jacket. The optical fiber 1012, with jacket material applied, can pass through a second curing oven 1022. The resultant optical cable 1000 can include an optical fiber 1012 having a core and a cladding, surrounded by a buffer coating, which is in turn surrounded by a graphenic element, which in turn is surrounded by a jacket.

In alternate embodiments, the graphene applicator 1018 can be positioned before the first coating cup 1014. Other alterations to the order of the equipment supported by the support 1002 can be made to change the order of materials applied to the optical fiber 1012.

In some embodiments where no buffer coating is desired, the first coating cup 1014 and first curing oven 1016 can be omitted. In some embodiments where no jacket is desired, the second coating cup 1020 and second curing oven 1022 can be omitted.

Figure 11:
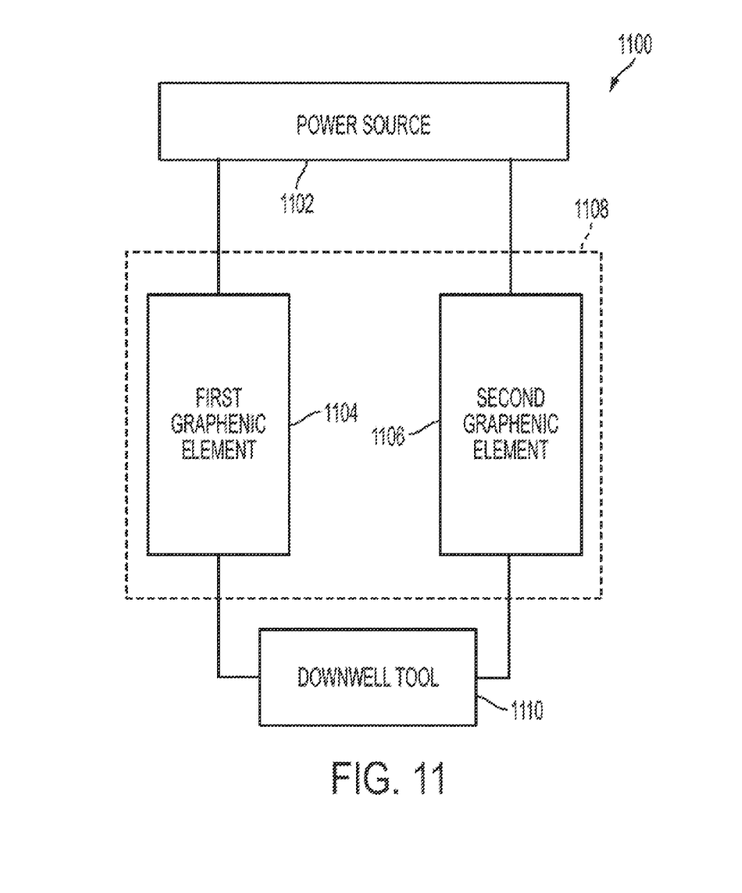
FIG. 11 is a schematic diagram illustrating a circuit formed using a first graphenic element and a second graphenic element according to one embodiment.

FIG. 11 is a schematic diagram illustrating a circuit 1100 formed using a first graphenic element 1104 and a second graphenic element 1106 according to one embodiment. A power source 1102 can be positioned at the surface or elsewhere. An optical cable 1108 can be positioned within a wellbore in order to provide optical communication between a downhole tool 1110 and equipment at the surface. Within the optical cable 1108, a first graphenic element 1104 and a second graphenic element 1106 can act as electrical pathways to allow a circuit to be completed between the power source 1102 and the downhole tool 1110.

Figure 12:
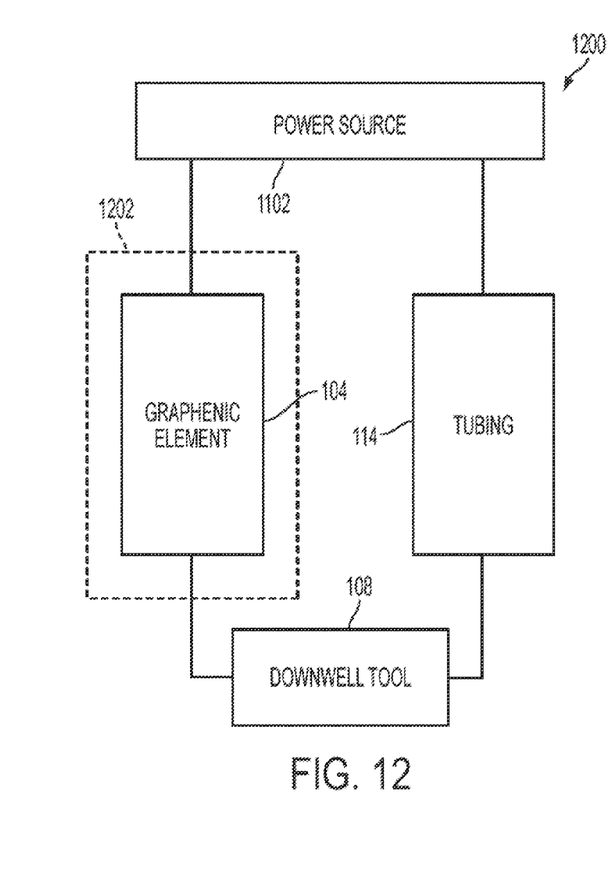
FIG. 12 is a schematic diagram illustrating a circuit formed using a graphenic element and tubing according to one embodiment.

FIG. 12 is a schematic diagram illustrating a circuit 1200 formed using a graphenic element 104 and tubing 114 according to one embodiment. A power source 1102 can be positioned at the surface or elsewhere. An optical cable 1202 can be positioned within a wellbore in order to provide optical communication between a downhole tool 108 and equipment at the surface. Within the optical cable 1202, a graphenic element 104 can provide an electrical pathway between the power source 1102 and the downhole tool 108. The tubing 114 can be electrically conductive and can complete a circuit between the power source 1102 and the downhole tool 108.

Optical cables that use graphenic elements to conduct electricity, rather than copper conductors, can be significantly smaller in diameter than optical cables with copper conductors. Optical cables, including one or more optical fibers and one or more graphenic elements, can have diameters less than six millimeters. Optical cables, including one or more optical fibers and one or more graphenic elements, can have diameters less than about two millimeters. An optical cable including an optical fiber and a graphenic element can have a diameter less than about one-half of a millimeter.

Optical cables that use graphenic elements to conduct electricity, rather than copper conductors, can be significantly lighter than optical cables with copper conductors.

Optical cables that use graphenic elements to conduct electricity, rather than copper conductors, can be more suitable for permanent downhole monitoring. An optical cable with a graphenic element that is approximately 40-50 nm thick can provide 1 kV with a about 3 milliwatts in a downhole environment, which can necessitate an optical cable of approximately 6-7 km in length.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A hybrid optical cable, comprising:
   an optically transmissive fiber that is coupleable to a downhole tool for providing a communication path between the downhole tool and a device at a surface of a wellbore;
   an electrically conductive graphenic element wrapped around the optically transmissive fiber, wherein the electrically conductive graphenic element includes at least one of a graphenic ribbon or a graphenic strand; and
   an end connector electrically coupled to the graphenic element and electrically coupleable to the downhole tool for providing an electrical signal to the downhole tool.

2. The cable of claim 1, wherein the graphenic element is the graphenic ribbon and the graphenic ribbon is wrapped around the optically transmissive fiber in a helix-like configuration.

3. The cable of claim 2, further comprising a second electrically conductive graphenic ribbon wrapped around the optically transmissive fiber and electrically insulated from the graphenic ribbon.

4. The cable of claim 1, wherein the graphenic element is the graphenic ribbon and the graphenic ribbon is longitudinally wrapped around the optically transmissive fiber.

5. The cable of claim 1, wherein the electrically conductive graphenic element is approximately 40 nm to approximately 50 nm thick.

6. The cable of claim 1, further comprising a buffer layer between the optically transmissive fiber and the graphenic element, wherein the graphenic element is the graphenic ribbon and the graphenic ribbon is wrapped around the optically transmissive fiber.

7. The cable of claim 1, further comprising an electrically insulating jacket surrounding the graphenic element.

8. A method, comprising:
   providing an optically transmissive fiber that is coupleable to a downhole tool for providing a communication path between the downhole tool and a device at a surface of a wellbore;
   applying an electrically conductive graphenic element to the optically transmissive fiber, wherein applying the electrically conductive graphenic element includes at least one of:
      wrapping a graphenic ribbon around the optically transmissive fiber;
      synthesizing or sooting a graphenic layer on a radial surface of the optically transmissive fiber; or
      disposing a strand of graphene radially adjacent to the optically transmissive fiber;
   enclosing the optically transmissive fiber and the electrically conductive graphenic element in an electrically insulating jacket; and
   electrically coupling an end connector to the graphenic element, the end connector being electrically coupleable to the downhole tool for providing an electrical signal to the downhole tool.

9. The method of claim 8, wherein applying the electrically conductive graphenic element includes wrapping the graphenic ribbon around the optically transmissive fiber in a helix-like configuration.

10. The method of claim 9, further comprising wrapping a second electrically conductive graphenic ribbon around the optically transmissive fiber in a second helix-like configuration, wherein the second graphenic ribbon is electrically insulated from the graphenic ribbon.

11. The method of claim 8, wherein applying the electrically conductive graphenic element includes longitudinally wrapping the graphenic ribbon around the optically transmissive fiber.

12. The method of claim 8, wherein applying the electrically conductive graphenic element includes synthesizing or sooting the graphenic layer and the graphenic layer is approximately 40 nm to approximately 50 nm thick.

13. The method of claim 8, wherein applying the electrically conductive graphenic element includes wrapping the graphenic ribbon around a buffer layer of the optically transmissive fiber.

14. An optical cable, comprising:
   an optically transmissive fiber that is coupleable to a downhole tool for providing a communication path between the downhole tool and a device at a surface of a wellbore;
   an electrically conductive ribbon of graphene wrapped around the optically transmissive fiber;
   an electrically insulating jacket surrounding the graphenic element; and
   an end connector electrically coupled to the conductive ribbon of graphene and electrically coupleable to the downhole tool for providing an electrical signal to the downhole tool.

15. The cable of claim 14, wherein the ribbon of graphene is wrapped around the optically transmissive fiber in a helix-like configuration.

16. The cable of claim 15, further comprising a second electrically conductive ribbon of graphene wrapped around the optically transmissive fiber and electrically insulated from the ribbon of graphene.

17. The cable of claim 14, wherein the ribbon of graphene is longitudinally wrapped around the optically transmissive fiber.

* * * * *